No. 12,266. REISSUED AUG. 30, 1904.
F. H. ALFRED & P. CHIPMAN.
RAILROAD TIE.
APPLICATION FILED FEB. 15, 1904.
2 SHEETS—SHEET 1.
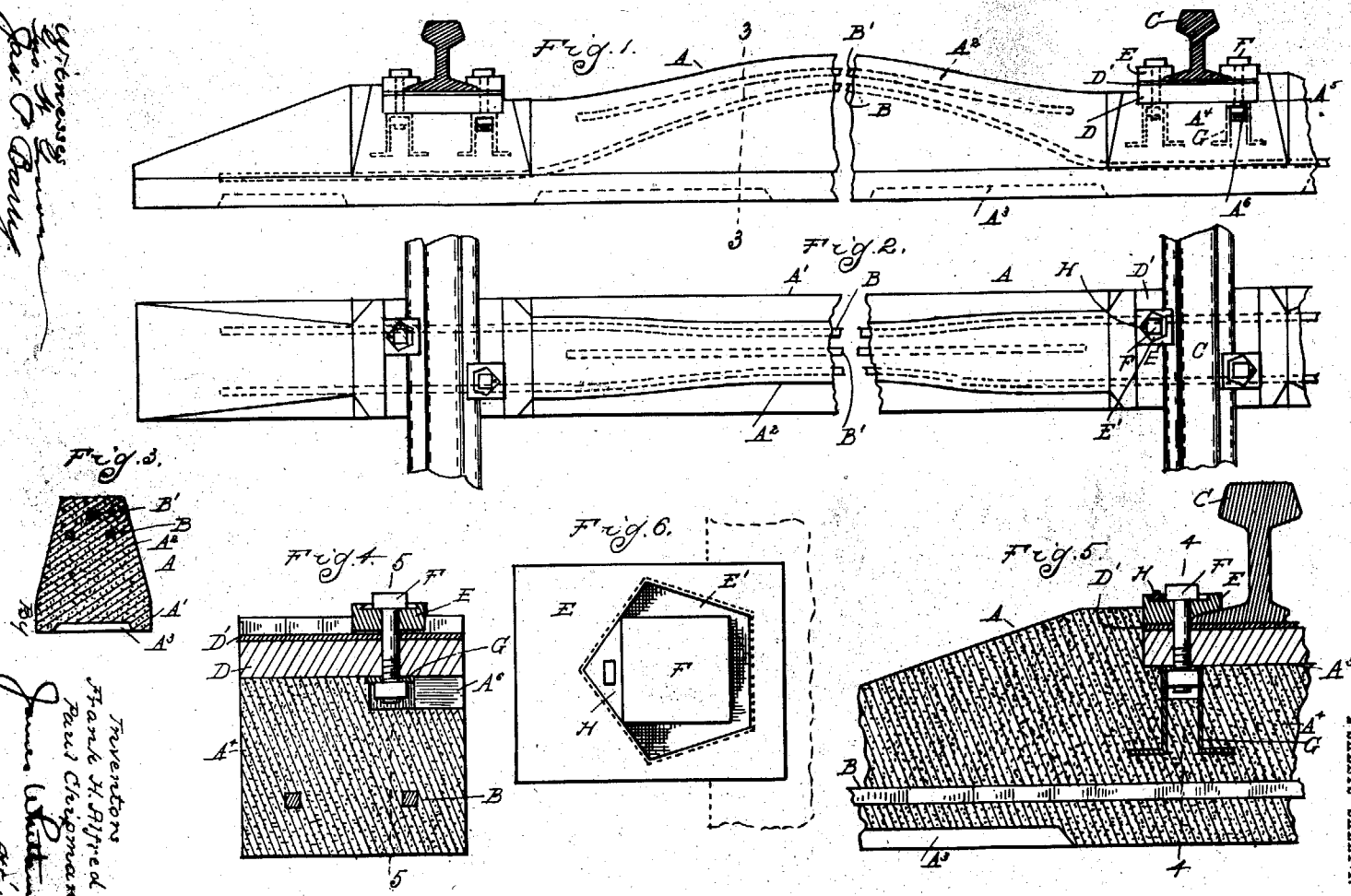
Witnesses
Geo. H. Graves
Jas. P. Barry
Inventors
Frank H. Alfred
Paul Chipman
By James Whittemore
Atty.

No. 12,266. REISSUED AUG. 30, 1904.

F. H. ALFRED & P. CHIPMAN.

RAILROAD TIE.

APPLICATION FILED FEB. 15, 1904.

2 SHEETS—SHEET 2.

Witnesses
Geo. H. Graves
Jas. P. Barry

Inventors
Frank H. Alfred
Paul Chipman
James Whittemore
Att'y.

No. 12,266. Reissued August 30, 1904.

UNITED STATES PATENT OFFICE.

FRANK H. ALFRED AND PAUL CHIPMAN, OF DETROIT, MICHIGAN.

RAILROAD-TIE.

SPECIFICATION forming part of Reissued Letters Patent No. 12,266, dated August 30, 1904.

Original No. 722,200, dated March 10, 1903. Application for reissue filed February 15, 1904. Serial No. 193,742.

*To all whom it may concern:*

Be it known that we, FRANK HOOKER ALFRED and PAUL CHIPMAN, citizens of the United States, residing at Detroit, county of Wayne, State of Michigan, have invented a certain new and useful Improvement in Railroad-Ties; and we declare the following to be a full, clear, and exact description of the invention, such as will enable others skilled in the art to which it pertains to make and use the same, reference being had to the accompanying drawings, which form a part of this specification.

The object of the invention is to provide a new and improved railroad-tie which is simple and durable in construction, cheap to manufacture, designed as a substitute for the wooden and all-metallic ties now in use, and arranged to combine concrete with metal to produce a tie in such a manner that the tensile strains on the tie are mostly borne by the metal, while the compressive strains are taken up by the concrete to secure the greatest strength.

The invention consists of novel features and parts and combination of the same, as will be more fully hereinafter described and then pointed out in the claims.

A practical embodiment of the invention is represented in the accompanying drawings, forming a part of this specification, in which similar characters of reference indicate corresponding parts in all the views.

Figure 14:
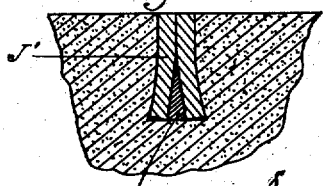
Figure 7:
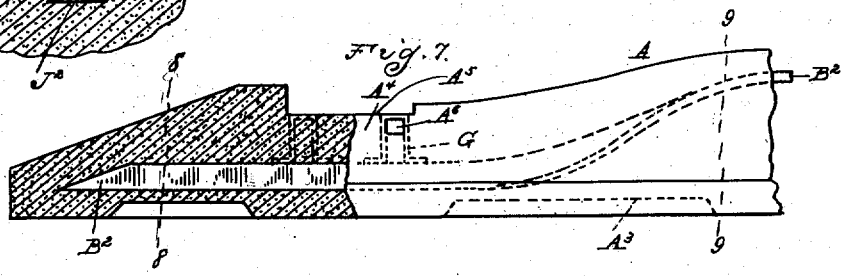
Figure 8:
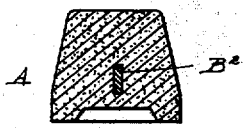
Figure 9:
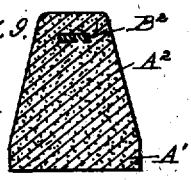
Figure 10:
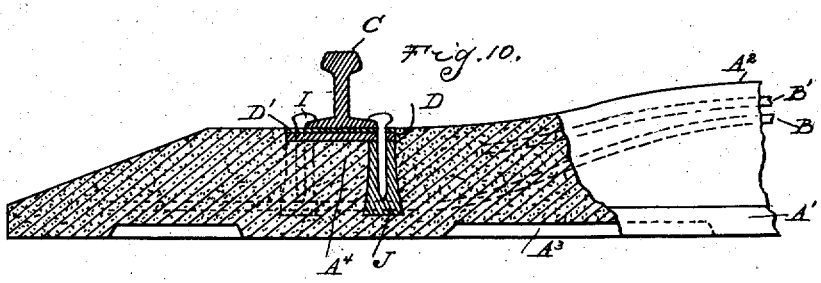
Figure 11:
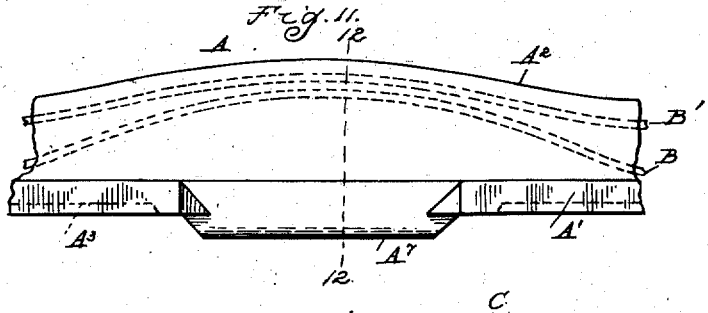
Figure 12:
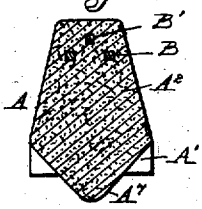
Figure 13:
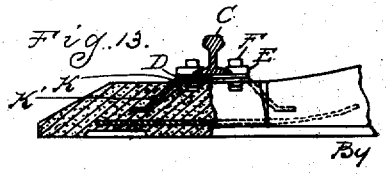

Figure 1 is a side elevation of the tie, showing the rails in place. Fig. 2 is a plan view of the same. Fig. 3 is a transverse section of the same on line 3 3 of Fig. 1. Fig. 4 is an enlarged cross-section of the same on the line 4 4 of Fig. 5. Fig. 5 is a sectional side elevation of the same on the line 5 5 of Fig. 4. Fig. 6 is an enlarged plan view of the fastening-plate and bolt for fastening the rail in place on the tie. Fig. 7 is a side elevation, partly in section, of a modified form of the tie. Fig. 8 is a cross-section of the same on the line 8 8 of Fig. 7. Fig. 9 is a similar view of the same on the line 9 of Fig. 7. Fig. 10 is a sectional side elevation of the improvement, partly in elevation, and showing a modified form of the fastening device for holding the rail in place on the tie. Fig. 11 is a side elevation of the middle portion of a tie of modified form. Fig. 12 is a transverse section of the same on the line 12 12 of Fig. 11. Fig. 13 is a side elevation, partly in section, of another modified form of the improvement; and Fig. 14 is a sectional side elevation of another modified form of the improvement.

The railroad-tie consists, essentially, of a body A, made of concrete, and a metallic reinforce, preferably in the shape of one or more bars B B′, embedded lengthwise in the concrete body A, and, as plainly illustrated in the drawings, the principal reinforce members following the lines of maximum tension. The concrete body A consists of a base A′ and a web $A^2$, preferably arched at the middle top portion, as plainly indicated in Fig. 1, and the bottom of the base A′ is formed with recesses $A^3$ for receiving part of the ballast of the road-bed, so as to prevent shifting of the tie on the bed. The web $A^2$ is provided with tapering sides, as plainly indicated in Fig. 3, and with bearing portions $A^4$ near the ends of the body, the said bearing portions being flush on the sides with the sides of the base, (see Fig. 4,) and over the bearing portions extend the rails C, between the bases of which and the bearing portions $A^4$ are interposed cushions in the form of wooden blocks D and tie-plates D′, made of metal, each of the said cushions being set in a recess $A^5$, formed in the top of the bearing portion $A^4$.

In order to fasten the rails in position on the cushions to hold the latter against movement on the bearing portions $A^4$, we provide fastening-plates E, resting on top of the tie-plates D′ and extending over the top portions of the bases of the rails C, each fastening-plate E being engaged by the head of a bolt F, extending downward through the fastening-plate E, the tie-plate D′, the wooden block D, and through a stirrup G, embedded in the concrete material forming the bearing portion $A^4$, as will be readily understood by reference to Figs. 4 and 5, access being had to the stirrup for placing the nut of the bolt in position by a suitable opening $A^6$, formed in the concrete material and extending to one side of the bearing portion. (See Fig. 4.)

The head of each bolt F extends with its lower portion into a pentagonal recess E′, formed in the top of the corresponding fastening-plate E, and in a corner of this recess E′ is fitted a lock-plate H in the shape of an isosceles triangle, the sides of the recess E′, the base of the triangle, abutting against one side of the square head of the bolt F, so as to prevent the latter from turning after the locking-plate H is introduced in one of the corners of the recess E′. (See Fig. 6.) It is understood that the nut in the opening $A^6$ and engaging the stirrup G is prevented from turning by fitting against the sides of the stirrup, so that when the bolt F is firmly screwed into place and the locking-plate H is inserted, as described, then the bolt cannot jar loose, and consequently the several parts—that is, the fastening-plate E and the cushion D—are securely held in place to hold the rails C in position on the cushions and the latter in position on the bearing portions $A^4$.

It is understood that by the peculiar arrangement of the recess E′, the head of the bolt F, and the locking-plate H the bolt can be securely locked in the position it is in when screwed up, as the locking-plate H can be inserted into that corner of the recess E′ having a side of the bolt-head in corresponding position to the corner.

As indicated in Figs. 1, 2, 3, 4, and 5, we employ two long bars B and a short bar B′ as the metallic reinforce for the concrete body A. The long bars B are arched at the middle, spaced apart, and have substantially straight end portions that project laterally in proximity to the body-base and in substantially a common plane under and beyond the bearing portions $A^4$. By so forming the reinforce and embedding it in the concrete as described and illustrated each reinforce will follow from end to end of the tie-body the lines of maximum tension, so that the tensile strains to which the tie is subjected are mostly taken up by the metal reinforce, while the compression strains are borne by the concrete body A. It will be obvious that while the reinforce is shown as following exactly the line of maximum tension the position may vary within certain limits and the function of the reinforce be substantially carried out. It is necessary, however, that the portions of the reinforce immediately beneath the rails or bearing portions of the concrete body shall in every instance be arranged below the neutral axis of the tie, while the arched portion intermediate of the rails shall project above the axis, as indicated. We do not, moreover, limit ourselves to the particular type of the metallic reinforce, as a single bar $B^2$ may, for instance, be employed, as shown in Figs. 7, 8, and 9, and made in the shape of a flat bar arched at the middle portion and then given a quarter-twist, so that the end portions of the flat bar extend vertically through the bearing portions $A^4$ and into the ends of the body, as plainly indicated in Fig. 7, the bar following, however, similar to the bars B, the line of maximum tension through the tie.

The base A′ of the concrete body A may be varied and provided, for instance, with a downwardly-extended portion $A^7$ at or near the middle thereof, as plainly indicated in Figs. 11 and 12, to increase the bearing-surface under the middle of the tie to prevent what is known as "center-binding" of the track. The portion $A^7$ engages the ballast of the road-bed to prevent shifting of the tie in any direction.

The fastening device for holding a rail C to a cushion may also be varied. For instance, as shown in Fig. 10, ordinary rail-spikes I are employed, engaging with their heads the rail-base and being driven through apertures in the tie-plate D′ and wooden block D down into wooden plugs J, enlarged at their lower or base ends and embedded in the concrete material of which the bearing portion $A^4$ is formed. Thus when a cushion is in position on a bearing portion $A^4$ and a rail is placed on the said cushion then the rail can be spiked down onto the cushion by driving the spikes I through the plate D′ and block D into the plugs J.

The wooden plug J being largest at the bottom prevents pulling out of the plug from the concrete material. When it becomes necessary to remove a plug J and replace it by a new one, then a cylindrical plug J′ of wood is employed and split at one end to receive a wooden wedge $J^2$. (See Fig. 14.) This plug J′ and its wedge are set in the recess formed by the old removed plug to fill the recess on driving the plug home. (See Fig. 14.) The wedge may be dipped in an adhesive substance, such as glue, previous to inserting it in the plug.

In the modified form shown in Fig. 13 a holding metallic plate K is employed, located under the wooden cushion-block D and having an extension K′ extending downwardly and outwardly and embedded in the concrete material to hold the plate K in position. The heads of the bolts F abut against the under side of the plate K and extend in recesses formed in the top surface of the concrete tie-body, as shown in Fig. 13.

It is understood that the concrete body of the tie is molded in a suitable mold, with the metallic reinforce held in position therein, so as to be lengthwise embedded in the concrete body A.

The term "concrete" is understood to mean a mixture consisting of an aggregate of stone, gravel, sand, or other hard material embedded in a matrix, the cementing element of which is cement, lime, or other cohesive substance.

Having thus described our invention, we claim as new and desire to secure by Letters Patent—

1. A railroad-tie, comprising a concrete body and a metallic reinforce embedded lengthwise within the body and following substantially from end to end of the latter the line of maximum tension due to the load.

2. A railroad-tie, comprising a concrete body reinforced by one or more metallic bars embedded lengthwise within the body and following substantially from end to end of the latter the line of maximum tension due to the load.

3. A railroad-tie, comprising a concrete body and a metallic reinforce embedded lengthwise within the body, the portions of said reinforce immediately beneath the rails lying below the neutral axis of the body, and the section intermediate said rails being arched and extending above the axis.

4. A railroad-tie, comprising a concrete body having bearing portions near the ends, a metallic reinforce embedded lengthwise in the concrete body, and cushions interposed between the rails and the said bearing portions, the said cushions comprising a metallic tie-plate and a wooden block superimposed one on the other and free from said reinforce, as set forth.

5. A railroad-tie, comprising a concrete body having bearing portions near the ends, a metallic reinforce embedded lengthwise in the concrete body, cushions interposed between the rails and the said bearing portions and spaced from said reinforce, the said cushions comprising a metallic tie-plate and a wooden block superimposed one on the other, and a rail-fastening means for holding the rail in position on the corresponding cushion and the latter in position on the corresponding bearing portion, as set forth.

6. A railroad-tie, comprising a concrete body having bearing portions near the ends, a metallic reinforce embedded lengthwise in the concrete, an attaching device embedded in the concrete body at the bearing portion, a cushion held on the bearing portion for supporting the rail, the said cushion being located above the embedded attaching device, and a fastening device for holding the rail to the said cushion, the fastening device extending through the cushion and engaging the said embedded attaching device, as set forth.

7. A railroad-tie, comprising a concrete body having bearing portions near the ends, a metallic reinforce embedded lengthwise in the concrete, an attaching device embedded in the concrete body at the bearing portion, a cushion held on the bearing portion for supporting the rail, and a fastening device for holding the rail to the said cushion, the fastening device engaging the said embedded attaching device, the latter being in the form of a stirrup, to which lead openings formed transversely in the concrete body, as set forth.

8. A railroad-tie, comprising a concrete body having a base, tapering sides, bearing portions near the ends for the rails, and longitudinally-extending recesses formed in the under side of the said base, as set forth.

9. A railroad-tie, comprising a concrete body having a base, tapering sides, bearing portions near the ends for the rails, longitudinally-extending recesses formed in the under side of the said base, and a downwardly-extending integral portion at the middle of the base, as set forth.

10. A railroad-tie, comprising a concrete body having bearing portions for the rails, a metallic reinforce for the same embedded lengthwise in the concrete body, an attaching device embedded in the concrete body at the bearing portion, a cushion held on the bearing portion for supporting the rail, fastening-plates engaging the bases of the rails, and fastening devices extending through the fastening-plates and the said cushion and engaging the embedded attaching device, as set forth.

11. A railroad-tie, comprising a concrete body having bearing portions near the ends, a metallic reinforce embedded lengthwise in the concrete body, an attaching device embedded in the concrete body at the bearing portions, the said concrete body being provided with openings leading to the said embedded attaching device, a cushion held on the bearing portion for supporting the rail and comprising a metallic tie-plate and a wooden block superimposed one above the other, the said cushion being located above the embedded attaching device, and a fastening device for holding the rail to the cushion, the said fastening device extending through the parts of the cushion and engaging the embedded attaching device, as set forth.

12. A railroad-tie, comprising a concrete body reinforced by a metallic bar having an arched central portion and straight ends, said bar being embedded lengthwise within the body with the center projecting upwardly from and its ends lying substantially in parallelism with and in proximity to the body-base.

13. A railroad-tie comprising a concrete body having bearing-plates near its respective ends, and a metallic reinforce embedded lengthwise within the body and following substantially from end to end of the latter the line of maximum tension due to the load, the reinforcing member being spaced from said bearing-plates.

14. A railroad-tie comprising a concrete body having bearing-plates near its respective ends, and a metallic reinforce embedded lengthwise within the body, the portions of said reinforce immediately beneath the rails being spaced from said bearing-plates and lying below the neutral axis of the body and the section intermediate said rails being arched and extending above said axis.

15. A railroad-tie, comprising a concrete body, and a metallic reinforce embedded lengthwise within the body, the portions of said reinforce immediately beneath the rails and therebeyond lying below the neutral axis of the body, and the section intermediate said rails being arched and extending above the axis.

16. A railroad-tie comprising a concrete body having bearing portions near its ends, a horizontally-extended flat metallic reinforce embedded lengthwise in the concrete body, and cushions interposed between the rails and said bearing portions, the said cushions comprising a metallic tie-plate and a wooden block superimposed one on the other, and said reinforce being spaced at its respective ends beneath said tie-plates.

17. A railroad-tie, comprising a concrete body, and a metallic reinforce embedded lengthwise within the body, and following substantially from end to end of the latter the line of maximum tension due to the load, the respective ends of said reinforce lying below the neutral axis of the body.

18. A railroad-tie, comprising a concrete body reinforced by one or more metallic bars embedded lengthwise within the body and following substantially from end to end of the latter the line of maximum tension due to the load, the respective ends of the bars lying below the neutral axis of the body.

In testimony whereof we sign this specification in the presence of two witnesses.

FRANK H. ALFRED.
PAUL CHIPMAN.

Witnesses:
JAMES P. BARRY,
H. C. SMITH.